Figure 1:
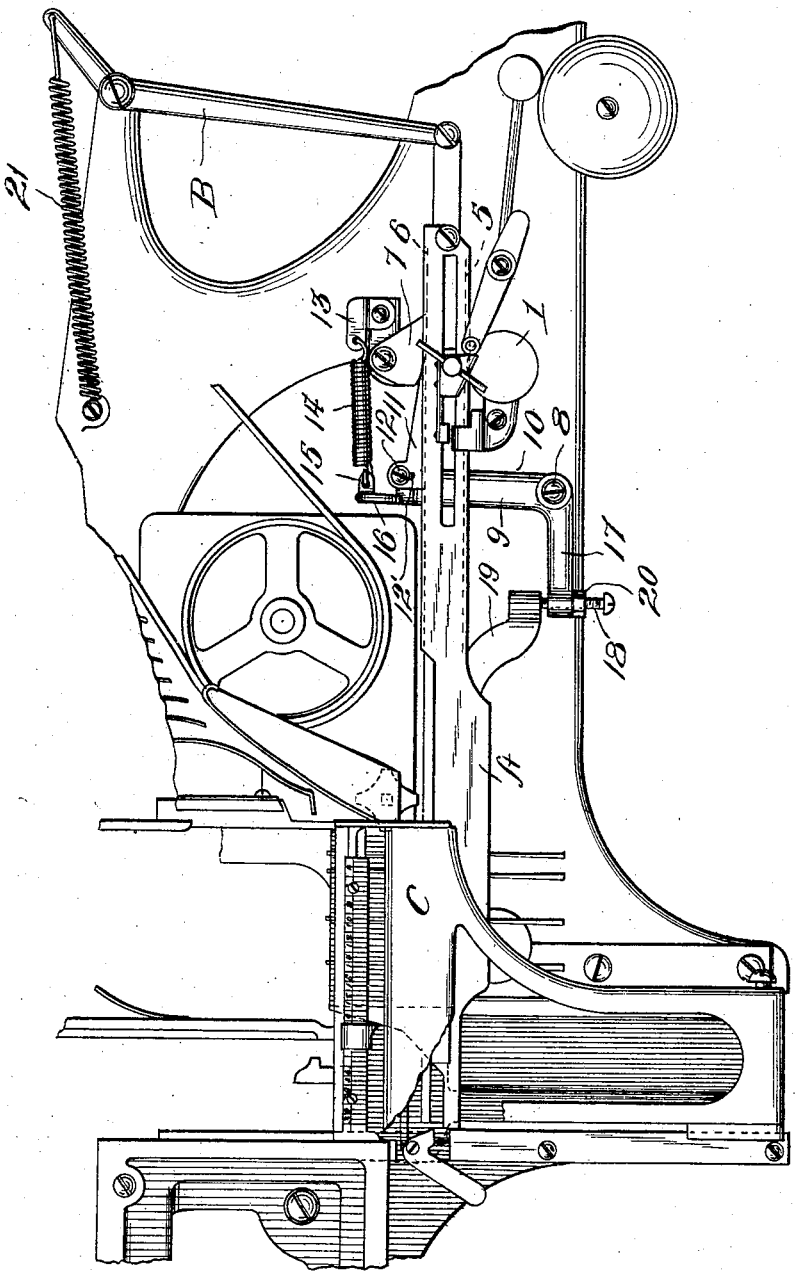

No. 880,346. PATENTED FEB. 25, 1908.
R. F. WILSON.
ASSEMBLER SLIDE BRAKE FOR LINOTYPE MACHINES.
APPLICATION FILED NOV. 21, 1907.

2 SHEETS—SHEET 1.

Witnesses
J. L. Wright,
C. Bradway

Inventor
Richard F. Wilson,

By Victor J. Evans
Attorney

No. 880,346. PATENTED FEB. 25, 1908.
R. F. WILSON.
ASSEMBLER SLIDE BRAKE FOR LINOTYPE MACHINES.
APPLICATION FILED NOV. 21, 1907.
2 SHEETS—SHEET 2.
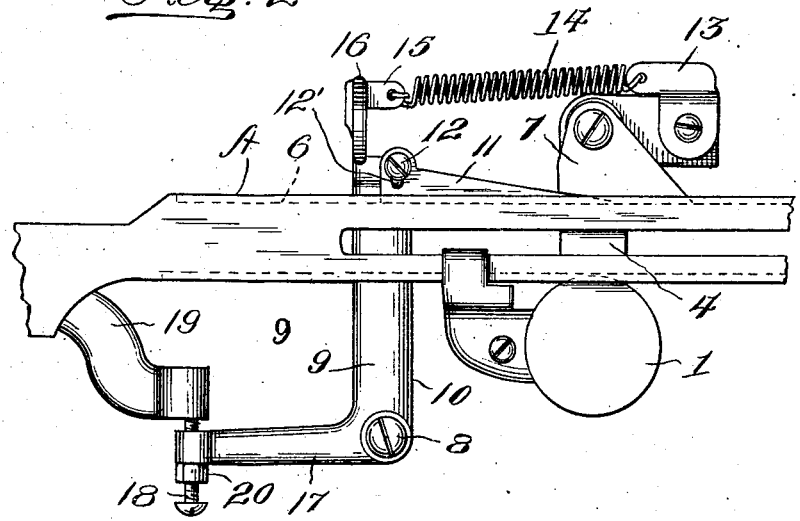
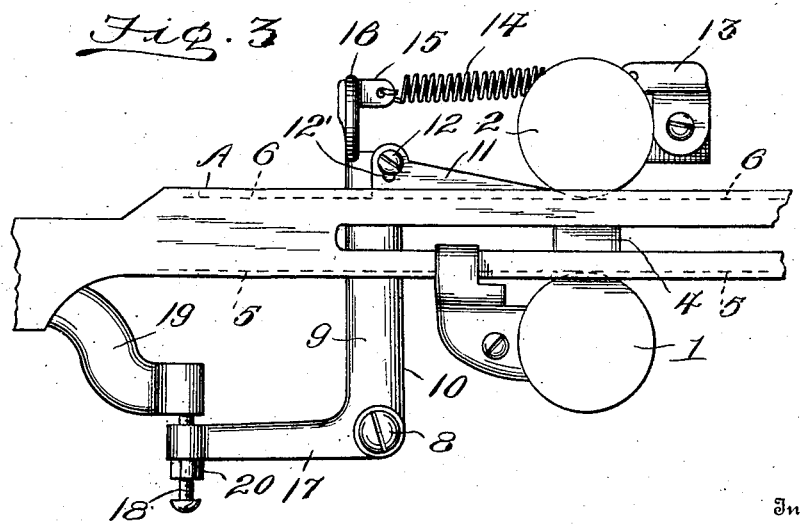
Witnesses
Inventor
Richard F. Wilson,
By Victor J. Evans
Attorney

UNITED STATES PATENT OFFICE.

RICHARD F. WILSON, OF ALBANY, NEW YORK.

ASSEMBLER SLIDE-BRAKE FOR LINOTYPE-MACHINES.

No. 880,346.  Specification of Letters Patent.  Patented Feb. 25, 1908.

Application filed November 21, 1907. Serial No. 403,142.

*To all whom it may concern:*

Be it known that I, RICHARD F. WILSON, a citizen of the United States, residing at Albany, in the county of Albany and State of New York, have invented new and useful Improvements in Assembler-Slide Brakes for Linotype-Machines, of which the following is a specification.

In the assembler slide brake, as ordinarily used in linotype machines, difficulty is experienced in that the brake shoe or gripping element becomes worn and has to be replaced by a new one which, at the best, is of very short life, and not only this, the sharp edge of the brake shoe soon wears away the assembler slide and renders it unsatisfactory for good service, thus requiring a new slide and adding to the expense and trouble in maintaining the machine in proper repair.

The principal object of the present invention is to overcome the objections above noted by providing a brake mechanism which is highly effective in operation and which is of long life, since there is practically little wear between the assembler slide and brake element.

A further object of the invention is the provision of a brake mechanism which is of comparatively simple and inexpensive construction, composed of few parts, and effective in service.

Another object of the invention is the provision of an assembler slide brake mechanism which is in the nature of an attachment whereby it can be easily and quickly substituted for the ordinary brake device without requiring any alterations in the linotype machine, as usually manufactured.

With these objects in view and others, as will appear as the description proceeds, the invention comprises the various novel features of construction and arrangement of parts which will be more fully described hereinafter and set forth with particularity in the claims appended hereto.

In the accompanying drawings, which illustrate one of the embodiments of the invention, Figure 1 is a fragmentary front elevation of a linotype machine showing the assembler slide and adjacent parts, with the improved brake mechanism for the said slide. Fig. 2 is an enlarged view of the brake mechanism showing a pivoted wedge substituted for the upper assembler slide roll. Fig. 3 is a similar view of the mechanism used in connection with the usual upper roll for the assembler slide.

Referring to the drawings, A designates the assembler slide which is of ordinary construction and is adapted to control the assembling of the matrices and spacers in the usual manner, the slide being returned to initial position by the spring-pulled lever B, after each composed line has been removed from the assembler by the elevating mechanism.

The construction of the assembler-elevating mechanism and line-adjusting device need not here be explained, since these constitute no part of the present invention.

The slide A is usually guided between two rolls 1 and 2, as shown in Fig. 3, that are supported on a bracket 4 in such a manner as to engage respectively, in grooves 5 and 6 in the top and bottom edges of the slide A. If desired, the upper roll 2 may be substituted by a pivoted wedge 7, as shown in Figs. 1 and 2, so as to coöperate with the brake device to hold the slide from movement.

The brake mechanism is designed to constitute an attachment which can be readily applied to the linotype machine in a simple and convenient manner. The usual brake lever is removed from the frame of the machine, and the same screw 8 forming a fulcrum for such lever, is employed for the pivot of the wedge-operating lever 9 of the present improved brake. On the upper end of the arm 10 of the lever 9 is a wedge 11 hingedly connected with the lever by a screw 12 that passes through a slot 12' in the wedge. The wedge 11 tapers outwardly and rides in the upper groove 6 of the assembler slide A and the point of the wedge is adapted to enter between the top roll 2 and slide A, as in the arrangement shown in Fig. 3, or between the wedge 7 and slide A in the form shown in Figs. 1 and 2. On the bracket 4 is secured an attachment 13 to which is secured one end of a helical extension spring 14 whose opposite end is attached to a laterally-extending lug 15 on the finger piece 16 on the lever 9. The horizontally-extending arm 17 of the wedge-operating lever 9 has a vertically-extended threaded aperture at its extremity in which is threaded a screw 18 that passes upwardly entirely through the aperture and projects beyond the arm so that the upper end of the screw can be engaged by the elevator actuated brake releasing lever 19. The head of the screw is lowermost so that it can be conveniently reached by a screwdriver when adjustment is desired for bringing the levers 9 and 19 into proper operative relation. The lever 19, it will be understood, is actuated by the assembler elevator C in the usual manner, so that when the elevator reaches the upper limit of its movement, the lever will be engaged so that its outer end will be depressed with the result that the lever 9 is tilted and the wedge 11 released from the assembler slide for the purpose of permitting the latter to return to initial position by contraction of the spring 21. As soon as the elevator C is lowered to normal position for permitting the assembler to receive a new line of matrices and wedges, the lever 19 will be tilted and thus disengaged or raised from the screw 18 for the purpose of permitting the spring 14 to move the lever 19 in a direction to cause the wedge 11 to grip the assembler slide. The lever 19 is of substantially the same design as the elevator actuated brake releasing lever commonly used on the linotype machines now in use with the exception that the adjusting screw between such lever and brake-carrying lever 9 is mounted entirely on the latter lever and arranged so that the adjustment of the screw can be more easily effected.

In practice, the spring 14 holds the lever 9 in such a position that the wedge 11 is urged between the pivoted wedge 7 and assembler slide A, thereby frictionally holding the latter from movement under the influence of the spring 21 while at the same time permitting the slide to move step by step as the matrices and spacers are delivered to the assembler in the usual manner. It will be observed that the taper of the wedge 11 is such that the latter will be automatically released from the wedge 7 and assembler slide with every step of the latter and will automatically grip the slide when the latter comes to rest after each step so that in case the operator should remove one or more matrices for any purpose from the assembler, the slide will be locked against movement to the right until the operator so desires. In case it is required to let the slide return to the right after removal of one or more matrices, the operator grips the finger piece 16 and pulls the lever 9 to the left for effecting the release of the wedge from the slide, whereupon the latter will be moved by the spring 21. After a line has been composed, the assembler elevator is shifted by the operator in the usual manner and adjacent the end of the movement of the elevator, the brake is automatically released in the manner hereinbefore described, so that the assembler slide can be returned to normal position. After the line is thus presented to the mold, the elevator is allowed to drop to normal position and thereby remove the lever 19 from the lever 9, so that the brake will be rendered operative.

From the foregoing description, taken in connection with the accompanying drawings, the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative, and that such changes may be made when desired as are within the scope of the claims.

Having thus described the invention, what I claim is:—

1. In a linotype machine, the combination of an assembler slide, means for guiding the slide, with a brake mechanism therefor including a wedge-shaped braking element mounted to engage the said means and to be held in gripping engagement with the slide by the said means.

2. In a linotype machine, the combination of an assembler slide, with a brake mechanism, said mechanism including a slidable wedge resting on and supported by the slide for gripping the latter, and means engaged by the wedge for holding the latter in gripping relation.

3. In a linotype machine, the combination of an assembler slide, a brake element slidably mounted on the slide, and a relatively fixed abutment for forcing the element in engagement with the slide.

4. In a linotype machine, the combination of an assembler slide, with a brake mechanism, said mechanism comprising a spring-actuated lever, a wedge-shaped brake element connected therewith, and a relatively fixed abutment between which and the slide the element is adapted to engage.

5. In a linotype machine, the combination of an assembler slide, with a brake mechanism therefor, said mechanism comprising a lever, a wedge resting on the slide, a slot and pin connection between the wedge and lever, a spring connected with the lever to yieldingly hold the wedge in gripping position, and a device disposed adjacent the slide for causing the wedge to grip the latter under the movement of the spring.

6. In a linotype machine, the combination of an assembler slide, with a brake mechanism therefor, said mechanism comprising a wedge bearing on the slide, means for yieldingly holding the slide in gripping position, and an abutment with which the wedge engages for forcing the latter against the slide.

7. In a linotype machine, the combination of an assembler slide, with a brake mechanism therefor, said mechanism comprising a bodily movable braking element, a spring acting on the same, and a pivoted wedge between which and the slide the element engages.

8. In a linotype machine, the combination of an assembler slide, with a brake mechanism therefor, said mechanism comprising a lever, means for limiting the movement of the lever, a spring acting on the lever, a device disposed adjacent the slide, and a wedge connected with the lever and bearing on the slide and engaged between the latter and device.

9. A brake attachment for linotype machines comprising a lever, a wedge loosely connected therewith to rest on and be supported by the assembler slide, a spring connected with the lever, and means for attaching the lever to a suitable part of the machine.

In testimony whereof I affix my signature in presence of two witnesses.

RICHARD F. WILSON.

Witnesses:
ALEXANDER J. GREEN,
EDWARD OSBORN.